United States Patent
Guillou et al.

(10) Patent No.: US 11,446,607 B2
(45) Date of Patent: Sep. 20, 2022

(54) PROCESS FOR CAPTURING A HEAVY METAL CONTAINED IN A MOIST GAS, INTEGRATING A HEAT PUMP TO COOL THE GAS BEFORE ELIMINATING WATER

(71) Applicant: IFP ENERGIES NOUVELLES, Rueil-Malmaison (FR)

(72) Inventors: Florent Guillou, Ternay (FR); Fabien Porcheron, Mions (FR); Karin Barthelet, Lyons (FR); Arnaud Baudot, Vernaison (FR); Yann Lepine, Rueil-Malmaison (FR); Clotilde Jubin, Boulogne Billancourt (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 533 days.

(21) Appl. No.: 14/909,326

(22) PCT Filed: Jun. 17, 2014

(86) PCT No.: PCT/FR2014/051495
§ 371 (c)(1),
(2) Date: Feb. 1, 2016

(87) PCT Pub. No.: WO2015/015069
PCT Pub. Date: Feb. 5, 2015

(65) Prior Publication Data
US 2016/0175771 A1    Jun. 23, 2016

(30) Foreign Application Priority Data
Jul. 31, 2013   (FR) ..................................... 13/57551

(51) Int. Cl.
*B01D 53/64*   (2006.01)
*B01D 53/26*   (2006.01)
(Continued)

(52) U.S. Cl.
CPC .......... *B01D 53/64* (2013.01); *B01D 53/265* (2013.01); *B01D 53/343* (2013.01); *B01D 53/81* (2013.01);
(Continued)

(58) Field of Classification Search
CPC ...... B01D 53/64; B01D 53/265; B01D 53/81; C10L 3/101; C10L 3/103; C10L 3/104; C10L 3/106
(Continued)

(56) References Cited

U.S. PATENT DOCUMENTS 3,580,003 A * 5/1971 Dolan ....................... F25B 1/00
62/115
3,755,989 A * 9/1973 Fornoff .................. B01D 53/04
95/134
(Continued)

FOREIGN PATENT DOCUMENTS

| CN | 102250658 A | 11/2011 |
| JP | 2011-194286 A | 10/2011 |
| WO | 2011/083297 A1 | 7/2011 |

OTHER PUBLICATIONS

International Search Report dated Sep. 18, 2014 issued in corresponding PCT/FR2014/051495 application (pp. 1-3).
English Abstract of CN 102250658 A published Nov. 23, 2011.

*Primary Examiner* — Anita Nassiri-Motlagh
(74) *Attorney, Agent, or Firm* — Millen, White, Zelano and Branigan, P.C.; Harry B. Shubin

(57) ABSTRACT

Capturing mercury or arsenic heavy metal from a moist gas containing water vapour, by:
a) cooling the moist gas by heat exchange with a heat transfer fluid produced in
e) in order to obtain a gas cooled to a temperature Tf, vaporizing the heat transfer fluid;
(Continued)

b) separating condensed water and condensates contained in the cooled gas obtained in a) obtaining a gas depleted in water and a liquid stream containing water;

c) compressing vaporized heat transfer fluid obtained from a) obtaining compressed heat transfer fluid;

d) heating water-depleted gas by heat exchange with compressed heat transfer fluid obtained in c) obtaining a cooled heat transfer fluid and a gas reheated to a temperature Tc;

e) decompressing cooled heat transfer fluid obtained in d), recycling heat transfer fluid to a);

f) contacting reheated gas obtained in d) with a capture mass for said heavy metal.

19 Claims, 2 Drawing Sheets

(51) Int. Cl.
<table>
<tr><td>C10L 3/10</td><td>(2006.01)</td></tr>
<tr><td>B01D 53/34</td><td>(2006.01)</td></tr>
<tr><td>B01J 20/02</td><td>(2006.01)</td></tr>
<tr><td>B01J 20/32</td><td>(2006.01)</td></tr>
<tr><td>B01J 20/06</td><td>(2006.01)</td></tr>
<tr><td>B01D 53/81</td><td>(2006.01)</td></tr>
</table>

(52) U.S. Cl.
CPC .......... B01J 20/02 (2013.01); B01J 20/0285 (2013.01); B01J 20/06 (2013.01); B01J 20/3204 (2013.01); B01J 20/3236 (2013.01); C10L 3/101 (2013.01); C10L 3/103 (2013.01); C10L 3/104 (2013.01); C10L 3/106 (2013.01); B01D 2251/60 (2013.01); B01D 2251/602 (2013.01); B01D 2253/1124 (2013.01); B01D 2253/1128 (2013.01); B01D 2256/24 (2013.01); B01D 2257/60 (2013.01); B01D 2257/602 (2013.01); B01D 2257/80 (2013.01); C10L 2290/06 (2013.01); C10L 2290/30 (2013.01); C10L 2290/54 (2013.01)

(58) Field of Classification Search
USPC .......................................................... 423/210
See application file for complete search history.

(56) References Cited

U.S. PATENT DOCUMENTS

<table>
<tr><td>5,248,488</td><td>A *</td><td>9/1993</td><td>Yan</td><td>C07C 7/005<br>423/210</td></tr>
<tr><td>5,354,357</td><td>A *</td><td>10/1994</td><td>Markovs</td><td>C22B 3/02<br>210/673</td></tr>
<tr><td>5,483,801</td><td>A *</td><td>1/1996</td><td>Craze</td><td>B01D 5/0084<br>62/5</td></tr>
<tr><td>5,727,903</td><td>A *</td><td>3/1998</td><td>Borray</td><td>B01D 53/229<br>405/128.15</td></tr>
<tr><td>5,928,617</td><td>A *</td><td>7/1999</td><td>Grande</td><td>B01D 53/0446<br>23/293 S</td></tr>
<tr><td>7,040,108</td><td>B1 *</td><td>5/2006</td><td>Flammang</td><td>F24D 11/0214<br>62/238.6</td></tr>
<tr><td>9,284,236</td><td>B2</td><td>3/2016</td><td>Catchpole</td><td></td></tr>
<tr><td>2010/0011663</td><td>A1</td><td>1/2010</td><td>Coyle</td><td></td></tr>
<tr><td>2010/0018228</td><td>A1 *</td><td>1/2010</td><td>Flammang</td><td>F25B 27/02<br>62/115</td></tr>
<tr><td>2011/0185896</td><td>A1</td><td>8/2011</td><td>Sethna et al.</td><td></td></tr>
<tr><td>2012/0000359</td><td>A1 *</td><td>1/2012</td><td>Bresler</td><td>B01D 53/75<br>95/51</td></tr>
<tr><td>2012/0167763</td><td>A1 *</td><td>7/2012</td><td>Briglia</td><td>B01D 53/04<br>95/134</td></tr>
<tr><td>2012/0308456</td><td>A1 *</td><td>12/2012</td><td>Leta</td><td>B01D 53/0438<br>423/228</td></tr>
<tr><td>2013/0090505</td><td>A1</td><td>4/2013</td><td>Catchpole</td><td></td></tr>
</table>

* cited by examiner

PROCESS FOR CAPTURING A HEAVY METAL CONTAINED IN A MOIST GAS, INTEGRATING A HEAT PUMP TO COOL THE GAS BEFORE ELIMINATING WATER

The present invention relates to the field of treatment of gaseous effluents containing heavy metals, in particular effluents of oil origin and their derivatives such as natural gas and synthesis gas. More precisely, the invention concerns the capture of heavy metals, in particular mercury or arsenic, which are present in a moist gaseous effluent, with the aid of a process that firstly can be used to reduce the moisture content of the gas, then secondly to partially purify the dehumidified effluent using a heavy metal capture technology.

Mercury is a metallic contaminant which is found in gaseous or liquid hydrocarbons produced in many regions of the world such as the Gulf of Niger, South America, North Africa or the Asia-Pacific region.

The elimination of mercury from hydrocarbons is desirable from an industrial viewpoint for a number of reasons. Firstly, the presence of mercury in those hydrocarbons is a risk to operators working in contact with these substances because mercury is toxic. In its elemental form, mercury is volatile and runs severe risks of neurotoxicity by inhalation. In its organic form, mercury gives rise to risks which are similar to neurotoxicity by skin contact. Secondly, the presence of mercury in hydrocarbons has a deleterious effect on conventional processing operations which are intended to upgrade those hydrocarbons. Conventionally, the hydrocarbons undergo catalytic reactions such as selective hydrogenation of the olefins produced by steam cracking or catalytic cracking of liquid hydrocarbons. However, the catalysts used, generally comprising noble metals such as platinum and palladium, may be deactivated by the mercury. In fact, mercury induces sintering of the catalysts by amalgamating with nanoparticles of noble metals. The reduction in the specific surface area of the catalysts leads to a very substantial loss of their catalytic activity.

Finally, it is important to eliminate mercury because its presence may cause problems with corrosion of the cryogenic aluminium-based heat exchangers, which could give rise to serious industrial consequences.

For these reasons and more, it is desirable to eliminate or at least reduce the concentration of mercury in the gaseous hydrocarbon effluents.

Industrially, the elimination of mercury from gaseous effluents is carried out by moving the effluent to be treated through mercury guard beds (or demercuration units) filled with adsorbent materials, otherwise known as capture masses.

The impurity to be eliminated, in this case mercury, is then irreversibly retained, preferably by chemisorption, within or at the surface of the capture mass and the effluent evacuated from the capture mass bed is thus purified.

In a capture mass, mercury can be captured by reacting the mercury with an active phase based on elemental sulphur. In fact, elemental sulphur S reacts irreversibly with elemental mercury, Hg°, as follows:

$$Hg° (g/l)+S(s) \rightarrow HgS(s) \qquad (1)$$

The term "Hg° (g/l)" means that the mercury is dissolved in a gaseous (g) or liquid (l) fluid phase. In contrast, "(s)" denotes solid phases constituted by the active phase of the capture mass and by the reaction product.

The product formed, HgS, known as cinnabar or metacinnabar, is a chemically inert, mineral phase which is a solid over a vast range of temperatures. Thus, the mercury is trapped in the capture mass and the effluent to be treated is purified. Other active phases may be used, such as metallic sulphides, for example copper sulphide (CuS).

Conventionally, capture masses are obtained by methods for impregnating the active phase onto porous activated carbon or alumina type supports, or indeed by co-granulation of the active phase with a binder such as aluminium oxide, for example.

However, these capture masses may suffer from malfunctions when the gaseous effluent to be treated is moist. On the one hand, depending on the active phase selected, it may be leached out by the presence of liquid water or liquid hydrocarbons and be entrained in the stream to be treated, or indeed the binder might react with the water to form a dense and compact phase which will block the movement of the gas. On the other hand, the presence of water in the vapour form in the gas to be treated at high moisture contents may cause the appearance of capillary condensation phenomena on the porous supports used. This phenomenon results in the appearance, at a given temperature, of liquid water at pressures below the saturated vapour pressure of water ($P_0$). For a pore model with a cylindrical shape, Kelvin's equation (equation 2) can be used to determine the critical pore diameter (Rc) beyond which the pores will be filled with liquid water.

$$Rc=-2\gamma Vm \cos \theta / RT/\log 10(P/P_0) \qquad (2)$$

in which P is the pressure of the gas, T is the temperature of the gas, R is the perfect gas constant (R=8.314 J·K$^{-1}$·mol$^{-1}$), Vm is the molar volume of water, γ is the gas/water surface tension and θ is the water/solid contact angle. $P/P_0$ corresponds to the definition of the relative humidity of the effluent. The smallest sized pores, in particular micropores (d<2 nm), are thus much more sensitive than mesopores (2<d<50 nm) or macropores (d>50 nm) to the capillary condensation phenomenon (d corresponds to the pore diameter).

The relative humidity of natural gas, also known as the humidity level or the moisture level or moisture content, corresponds to the ratio of the partial pressure of the water vapour contained in the gas over the saturated vapour pressure, also termed the vapour tension, at the same temperature. Thus, it is a measure of the ratio between the water vapour content of the air and its maximum capacity to contain it under these pressure and temperature conditions.

The capillary condensation mechanism may also occur with hydrocarbon vapours or volatile organic compounds.

The presence of capillary condensation has a large impact on the function of the capture mass, since it causes the appearance of a large resistance to the transfer of material in the bed and prevents the mercury from accessing the whole of the active phase. Very frequently, the performances of the guard bed are then greatly altered. A drop in performance of sulphur on activated carbon type capture masses has thus been observed over the nocturnal operation range of the guard bed. This malfunction is attributed to a drop in the temperature of the reactor at night, which causes the appearance of capillary condensation in the bed. Similarly, it has been shown that for a model gas (mercury in nitrogen) with a relative humidity of 10%, the performances of the capture mass based on sulphur deposited on an activated carbon are reduced by 25%.

Thus, it is important to place the mercury guard bed at an appropriate location in the chain of the process in order to operate the unit in an optimal manner. In general, for natural gas working, the gas is extracted from the geological medium on production wells. At the outlet from the production wells, the natural gas is charged with water and liquid hydrocarbons (condensates). Thus, a three-phase stream is obtained, composed of gas, liquid and sludge, which is channelled to a unit for trapping sludge which is usually known as a slug catcher. In general, the slug catcher is in the form of tubes disposed at a specific inclination which can be used to control the flow of the mixture and deposit the sludge.

At the outlet from this unit, the mixture is sent to a separator known as a primary separator. Thus, three phases are obtained: water, condensates and gas. The gas obtained from the primary separator is sent to a coalescer which causes the entrained liquid to fall towards the primary separator. At the outlet from the coalescer, the gas is theoretically just at saturation point, but in practice, entrained liquid is frequently present to a greater or lesser extent, usually in the form of droplets in suspension in the gas, depending on the performance of the installed coalescer. The gas is then deacidified, generally using a unit for eliminating acid gases—generally by an amine treatment—which can be used to selectively eliminate $H_2S$ and $CO_2$. The treated gas then passes into a drying unit for reducing the moisture content to values of a few ppm. The natural gas may be dried exclusively by contact with a glycol solution or by movement in a bed of adsorbents.

The mercury guard bed is very often placed in the chain of the process after these driers. The gas has been dried to a substantial extent, and so the guard bed can be operated under favourable conditions, in particular avoiding problems with capillary condensation in the mercury adsorbing material. However, these drying units often use glycol type compounds in which the mercury can dissolve. Document WO2005/047438 in particular demonstrates that the concentration of mercury in the glycol may reach high values, of the order of 2.9 ppm. During the regeneration step, the glycol solution is heated to temperatures close to T=200° C., and thus some of the mercury is discharged into the atmosphere.

Another solution, proposed in U.S. Pat. No. 5,223,145, consists of a process eliminating both mercury and water. In that layout, a first bed of molecular sieve is used to eliminate water and mercury jointly. When the efficiency of purification decreases, the stream is directed to a second bed of regenerated molecular sieve. The first bed is then regenerated by passing a hot dry gas through the inlet to the column in order to generate a moist gas polluted with mercury at the outlet from this column. This regeneration gas must then itself be treated by a guard bed in order to eliminate the mercury. This solution is particularly unsuitable because on the one hand it only transfers the problem from one effluent to another, and on the other hand it necessitates a) frequent regeneration of the adsorbers at a temperature which is difficult to reach for a gas treatment plant and b) it requires recourse to a second system for the elimination of non-regeneratable mercury, which further increases the associated investment costs.

Another solution proposed in the U.S. Pat. No. 5,120,515 consists of disposing desiccants in the same column for eliminating water, and aluminas impregnated with an active phase in order to capture mercury. This solution is also not economically viable, as it is necessary to periodically regenerate the desiccants, incurring overcosts. In addition, mention is made in that patent that that regeneration step gives rise to discharges of mercury which thus have to be retreated by another demercuration unit.

In addition, positioning the mercury guard bed downstream of the drying device results in contamination of the mercury of the whole process chain upstream of the guard bed. Even if the mercury guard bed were to be positioned between the deacidification and dehydration units, the whole of the process chain upstream of the guard bed, in particular the amines treatment unit, would be polluted with mercury.

It is possible to place the mercury guard bed as far upstream as possible on the process chain, for example after the coalescer. This position, however, gives rise to a number of disadvantages.

If the coalescer is not very efficient or even damaged, continuously entrained liquid (water and condensates) could be supplied to the demercuration unit.

Furthermore, even at saturation, heat losses in the line between the coalescer and the demercuration unit may generate condensation. Particularly if the line is long, if it rains or it is cold, because the line is not insulated, the demercuration unit will receive even more liquid.

Finally, there is a phenomenon of retrograde condensation, a peculiarity of natural gas thermodynamics, generating condensation during the isothermal reduction in pressure of natural gas. In practice, the pressure drops in the line, but in particular in the demercuration unit, may generate partial condensation of water and hydrocarbon condensates.

The most direct solution thus consists of reducing the moisture content of the moist gas by superheating the natural gas, for example by providing a superheater. However, in view of the flow rates routinely encountered in natural gas units, this solution turns out to be very expensive energetically and as a result, financially.

The aim of this invention is to propose an optimized process for the treatment of moist gas which means that the heavy metal guard bed can be placed downstream of a gas-liquid separator, for example a coalescer and preferably upstream of the step for the elimination of acid gases, while providing for an optimized function of the heavy metal capture masses, by carrying out a partial dehumidification of the moist gas obtained from the gas-liquid separator.

The Applicant has astutely discovered that integrating a gas-liquid separation step, for example using a coalescer, with a heat pump circuit means that, for a minimal expenditure of energy, the problems raised above can be solved by guaranteeing a sufficiently low relative humidity to avoid condensation problems and, a fortiori, capillary condensation, on the heavy metal capture masses.

In general, the invention described a process for capturing a heavy metal, selected from mercury and arsenic, contained in a moist gas comprising water vapour, in which the following steps are carried out:

a) cooling the moist gas by heat exchange with a heat transfer fluid produced in step e) in order to obtain a gas cooled to a temperature Tf, the heat transfer fluid being vaporized during step a);

b) separating at least a portion of the condensed water contained in the cooled gas obtained in step a) in a manner such as to obtain a gas which is depleted in water and a liquid stream containing water;

c) compressing the vaporized heat transfer fluid obtained from step a) in a manner such as to obtain a compressed heat transfer fluid;

d) heating the water-depleted gas by heat exchange with the compressed heat transfer fluid obtained in step c) in order to obtain a cooled heat transfer fluid and a gas reheated to a temperature Tc;

e) decompressing the cooled heat transfer fluid obtained in step d), the decompressed heat transfer fluid being recycled to step a);

f) bringing the reheated gas obtained in step d) into contact with a heavy metal capture mass in order to obtain a gas depleted in heavy metal.

In accordance with the invention, the temperature Tc may be determined in a manner such that the reheated moist gas obtained in step d) has a relative humidity of less than 90%.

The difference between Tc and Tf may be less than 50° C.

In particular in order to capture mercury, the capture mass may comprise an active phase selected from at least one metallic sulphide based on a metal selected from the group constituted by copper (Cu), chromium (Cr), manganese (Mn), iron (Fe), cobalt (Co) and nickel (Ni).

Alternatively, the capture mass may comprise an active phase composed of elemental sulphur.

When the gas contains $H_2S$, the capture mass may comprise an active phase composed of a metallic oxide based on a metal selected from at least one metallic oxide precursor of a metal selected from copper (Cu), chromium (Cr), manganese (Mn), iron (Fe), cobalt (Co) and nickel (Ni).

In particular in order to capture arsenic, the capture mass may comprise an active phase composed of at least one metallic oxide of a metal selected from copper (Cu) and lead (Pb).

The active phase may be distributed over a porous support, the porous support being selected from the group constituted by aluminas, phosphorus-containing aluminas, silica-aluminas, silicas, clays, activated carbons, zeolites, titanium oxides, zirconium oxides and mixtures thereof.

The heat transfer fluid may be selected from hydrocarbons containing 1 to 7 carbon atoms and optionally one or more heteroatomic ligands.

At least one of the following operations may be carried out:
  before carrying out step b), carrying out a supplemental step for cooling the cooled gas obtained in step a);
  before carrying out step c), carrying out a supplemental step for heating the vaporized heat transfer fluid obtained in step a);
  before carrying out step f), carrying out a supplemental step for heating the reheated gas obtained in step d);
  before carrying out step e), carrying out a supplemental step for cooling the cooled heat transfer fluid obtained in step d).

Exchange of heat from the vaporized heat transfer fluid obtained in step a) to the cooled heat transfer fluid obtained in step d) may be carried out.

In step b), a coalescer may be used in order to separate the condensed water contained in the cooled gas obtained in step a).

The heavy metal contained in the aqueous liquid stream obtained from step b) may be captured.

The moist gas may be selected from one of the following gases: a natural gas, a shale gas, a coal gas, a synthesis gas, combustion fumes, a gaseous hydrocarbon effluent, chlor-alkali plant exhaust gases, and rare earth production exhaust gases.

In the case of a natural gas, before carrying out step a), the following steps may be carried out:
  extracting a natural gas from an underground deposit; then
  introducing the natural gas into a sludge-eliminating device; then
  introducing the natural gas into a gas-liquid separation device then sending the natural gas to step a);

then, after step f), the following steps may be carried out:
  eliminating at least a portion of the $H_2S$ and $CO_2$ contained in the gas depleted in heavy metal; then
  eliminating at least a portion of the water vapour contained in the gas depleted in heavy metal.

BRIEF DESCRIPTION OF DRAWINGS

Other characteristics and advantages of the invention will become more apparent from the following description made with reference to the accompanying drawings, in which.

The invention consists of cooling a stream of moist gas supplying a gas-liquid separation step, for example carried out in a coalescer, in a heat exchanger in which evaporation of a heat transfer fluid of a heat pump circuit occurs. In the coalescer, then, conditions exist wherein saturation exists, but at a lower temperature than in the absence of the heat reduction step. The quantity of water condensed in the coalescer is thus higher than in the case in which no cooling of the moist gas occurs. Because of the operation of the coalescer, this surplus water is evacuated from the system by drainage and when downstream of the coalescer, the heat removed upstream is restored via a heat exchanger where condensation of the heat transfer fluid of a heat pumping circuit is carried out, restoring the gas to a temperature above its initial temperature, the gas then being under temperature and pressure conditions close to the initial conditions but with a substantially reduced water content and thus with a partial pressure of water vapour which differs substantially from the saturated vapour pressure.

The pressure of the water vapour in the stream downstream of the dehydration step for the gas in accordance with the invention may be adjusted using at least two parameters:
  firstly, the quantity of heat removed upstream of the coalescer, which will determine the temperature in the coalescer and thus the temperature at which the water vapour will condense in order to obtain a saturated system but at a lower temperature;
  secondly, the temperature reached by the stream downstream of the coalescer after reheating by the heat pump circuit where, depending on the efficiency of the heat pump system, the gas will also receive heat removed from upstream, a surplus of energy supplied by the equipment providing for compression of the heat transfer fluid. This surplus of energy supplied in the form of heat increases the temperature of the stream of downstream gas and thus further distances the system from the water vapour saturated vapour pressure.

Figure 1:
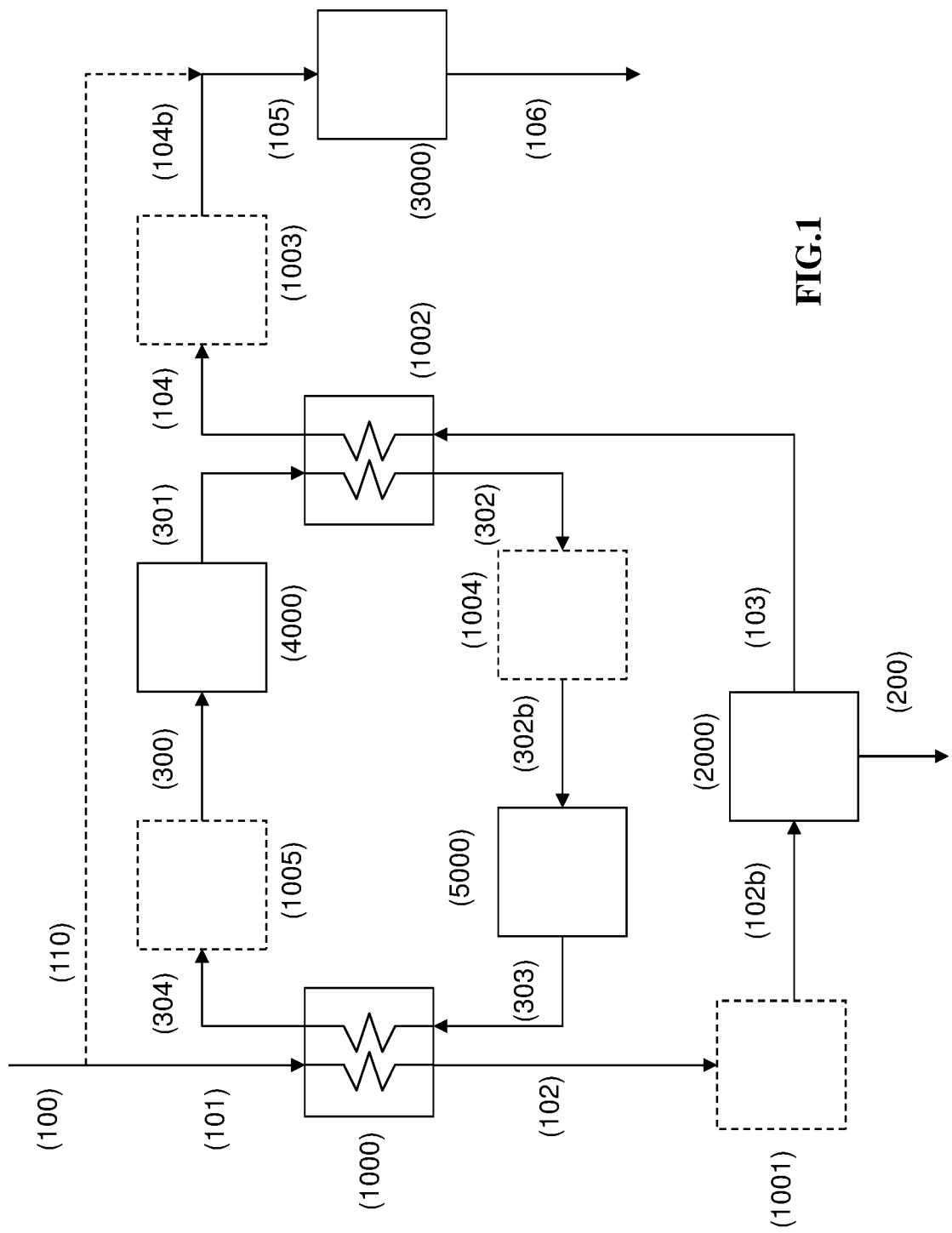
FIG. 1 represents the process for the reduction of the partial pressure of water vapour of a moist gas in accordance with the invention.

Referring to FIG. 1, the moist gas arrives via the conduit 100. The gas arriving via the conduit 100 may be at a pressure in the range 2 to 10 MPa, preferably at a pressure in the range 5 to 9 MPa, and at a temperature in the range 20° C. to 80° C., preferably at a temperature in the range 25° C. to 70° C. The moist gas comprises water vapour, for example at a relative humidity in the range 30% to 100%. The moist gas also comprises at least one heavy metal, for example mercury and/or arsenic, in proportions which may vary between 10 nanograms and 1 gram of mercury per $Nm^3$ of gas.

Depending on the selected configuration and the site conditions, it may be elected to treat all or a portion of the moist gas stream in order to reduce its partial pressure of water. If only a portion is treated, the treated portion will be the stream moving in the conduit 101 and the untreated portion will be the stream evacuated via the conduit 110. The distribution between the streams 101 and 110 will be determined such that the treated stream moving in the conduit 104b and the untreated stream moving in the conduit 110, when they are combined, provide a feed introduced into the heavy metal guard bed via the conduit 105, which feed satisfies the requirements in terms of not condensing on the guard bed, i.e. which preferably has a relative humidity of less than 90%.

A stream of saturated gas arriving via the conduit 101 is cooled using a heat exchanger 1000 by heat exchange with the heat transfer fluid of the heat pump system arriving via the conduit 303. This heat exchange is preferably carried out in counter-current mode. Preferably, a zone of the heat exchanger 1000 is devoted to superheating the evaporated heat transfer fluid. The heat exchanger 1000 may be constituted by one or more pieces of equipment depending on how it is desired to dissociate evaporation of the heat transfer fluid from superheating of the evaporated heat transfer fluid. The cooled saturated gas obtained from the heat exchanger 1000 via the conduit 102 may be cooled in a complementary and optional manner by a heat exchanger 1001 in order to condense a supplemental quantity of water. In this case, the cooled gas is obtained from the heat exchanger 1001 via the conduit 102b. This may be of interest, for example, but not exclusively, in the case in which it is desired to operate a cold utility available on-site to reduce the work demanded of the heat pump cycle or to treat a larger quantity of gas in the case of an increase in the capacity of the unit without in any way replacing or modifying the heat pump circuit. The gas arriving via the conduit 101 may be cooled to a value in the range 1° C. to 20° C., preferably in the range 2° C. to 10° C. If the heat exchanger 1001 is not used, the cooled moist gas moving in the conduit 102 is sent directly to the conduit 102b. Next, the cooled moist gas moving in the conduit 102b is introduced into a gas-liquid separator 2000. The function of this equipment is to separate the moist gas from droplets of liquid resulting from saturation of the condensables at the temperature of the system. This equipment 2000 is, for example, a coalescer. The document EP 2 473 250 A2 describes an example of an embodiment of a coalescer. The coalescer 2000 may be composed of a chamber provided with internal elements such as baffles and/or mats of fibres promoting condensation of droplets of liquid contained in the gas Eliminating the droplets of liquid is preferable, as this prevents them from being present in a system where there is a saturated gas which also then entrains condensed liquids which will then become fixed on the heavy metal guard bed. The gas-liquid separator 2000 produces a gaseous effluent evacuated via the conduit 103 and a liquid effluent evacuated via the conduit 200. The liquid effluent 200 is composed of water obtained from the condensation of gas, hydrocarbons obtained from the condensation of gas and optionally retrograde condensation, and optionally gas dissolved under the conditions for separation in the water-hydrocarbon mixture obtained from gas condensation. The gaseous effluent is introduced into the heat exchanger 1002 via the conduit 103 in order to be reheated by heat exchange with the heat transfer fluid arriving via the conduit 301. The heat transfer fluid is condensed in the heat exchanger 1002. The heat exchange in 1002 is advantageously carried out in counter-current mode. As was the case for 1000, the heat exchanger may preferably comprise zones for superheating the effluents in equipment which may or may not be separate. The heat provided by condensation of the heat transfer fluid corresponds on the one hand to the heat extracted from the gas 101 in the heat exchanger 1000, but also to the heat provided by the heat transfer fluid in the heat pump system, for example but not exclusively by the energy supplied by the heat transfer fluid pressure increasing equipment 4000 described below. The gas arriving via the conduit 103 may be heated to a value in the range 1° C. to 20° C., preferably in the range 2° C. to 10° C.

The saturated vapour pressure of a compound in a medium depends on the temperature and composition of the medium. If the temperature of the stream moving in the conduit 104 is greater than or equal to the temperature of the initial saturated gas stream moving in the conduit 100, the saturated vapour pressure is also higher or equal. However, the water content has reduced during the gas-liquid separation, to a temperature below the initial temperature. Thus, the gas 104 is no longer saturated. In order to remove it further from saturation, optionally, a supplemental superheating of the gas moving in the conduit 104 may be carried out using heat exchange at 1003. By way of non-exclusive example, this equipment may be a hot oil loop or a burner. This results in a superheated effluent evacuated via the conduit 104b. In the case in which only a portion of the initial gas stream has been treated, this effluent moving in the conduit 104b is combined with the untreated portion of the starting gas moving in the conduit 110 in order to form the mixture moving in the conduit 105. This stream of gas moving in the conduit 105 is treated on a heavy metal guard bed 3000. This produces a decontaminated stream of gas 106.

The heat pump circuit uses a heat transfer fluid. The heat transfer fluid supplying the heat pump circuit may be selected from the group formed by refrigerating fluids defined by the organization known as ASHRAE in the document Standards 34-2010.

The refrigerating fluid is preferably selected from the group of light hydrocarbons containing 1 to 7 carbon atoms and comprising or not comprising one or more heteroatomic ligands. This group comprises, for example, all alcohols in which the carbon backbone contains 1 to 7 carbon atoms irrespective of whether this backbone is linear or branched, such as methanol, ethanol, propanol, butanol, pentanol, hexanol or heptanol, or the corresponding diols or triols, as well as their isomers. The heat transfer fluid may also contain molecules comprising at least one fluorine or chlorine atom such as, for example, hexaflorocene $C_3F_6$, or chlorofluorocarbon gases such as dichlorodifluoromethane $CCl_2F_2$, or indeed hydrochlorofluorocarbon gases such as chlorodifluoromethane, $CHClF_2$. Still more preferably, the refrigerating fluid comprises at least 80% by weight of at least one of the following elements: propane, butane, pentane, hexane, heptane or any mixture of at least two of the mentioned five elements.

The heat pump circuit is described below. The evaporated and optionally superheated heat transfer fluid may be introduced into the heat exchanger 1005 via the conduit 304 in order to undergo optional supplemental superheating, for example by heat exchange with the condensed heat transfer fluid moving in the conduit 302 (in this case the heat exchangers 1005 and 1004 form a single piece of equipment). The evaporated and optionally superheated heat transfer fluid moving in the conduit 300 is compressed using a compressor 4000, for example but not exclusively a compressor which may be a centrifugal, reciprocating, screw or gear compressor. The choice of the technology depends on the flow rate of the heat transfer fluid and its nature (self-lubricating or not, molar mass, corrosive or non-corrosive nature, etc). Compression raises the temperature and pressure of the heat transfer fluid. The pressurized fluid obtained from the compressor via the conduit 301 is in the vapour form. The fluid 301 is condensed in a heat exchanger 1002 by heat exchange with saturated natural gas 103 obtained from the gas-liquid separator 2000. Condensation in the exchanger 1002 has the effect of moving the heat transfer fluid into the liquid phase and fixing the temperature at the condensation temperature under the selected pressure conditions. This results in the condensed heat transfer fluid being evacuated from the exchanger 1002 via the conduit 302, as a liquid, the temperature of which may optionally be reduced by heat exchange at 1004, for example by heat exchange with the evaporated heat transfer fluid moving in the conduit 304 (in this case the heat exchangers 1005 and 1004 form one and the same piece of equipment), to produce the stream moving in the conduit 302*b*. The condensed and optionally cooled fluid moving in the conduit 302*b* is decompressed in equipment 5000 producing a pressure drop, for example a valve or a reduction orifice, in order to produce the decompressed fluid moving in the conduit 303. The decompressed fluid has undergone partial evaporation, which causes a reduction in its temperature. The partially evaporated fluid is evaporated and optionally superheated by heat exchange with the initial saturated gas 101 in the heat exchanger 1001 which closes the heat pump circuit.

The temperature of the moist gas may vary as a function of the production site. However, the invention is implemented in a manner such that the temperature Tc of the gas 104 introduced into the guard bed is determined in a manner such that the gas 104 has a relative humidity of less than 90%, preferably less than 80%, highly preferably less than 75%. This moisture content threshold depends on the pore characteristics of the heavy metal capture mass. The temperature Tf corresponds to the temperature of the gas moving in the conduit 102.

The pressure of the heat transfer fluid on the side of the exchanger 1000, i.e. the evaporator, is selected such that the temperature of evaporation of the heat transfer fluid is in the range between the desired temperature Tf for the condensation point of the saturated gas 102 and 10° C. below Tf, preferably 2° C. to 5° C. below Tf.

The pressure of the heat transfer fluid entering the heat exchanger 1002, i.e. the condenser, is selected in a manner such that the temperature of condensation of the fluid is in the range between the desired temperature Tc for reheating the gas 104 and 10° C. above Tc, preferably between 2° C. and 5° C. above Tc.

In optimal manner, the difference between Tc and Tf is less than 50° C., and preferably Tc−Tf<30° C.; still more preferably, Tc−Tf<20° C., in order to obtain the best efficiency of the heat pump circuit.

The dehumidified gas arriving via the conduit 105 is treated by the heavy metal guard bed 3000. In a variation of the invention, the liquid effluent 200 leaving the unit 2000 is also treated by a heavy metal guard bed, after a separation step for recovering an aqueous effluent on the one hand and on the other hand a hydrocarbon effluent.

The effluent treated by the guard bed is preferably produced by injecting the effluent to be treated into a reactor containing the heavy metal capture mass in the form of a fixed bed. It is possible to use any type of capture mass known to the skilled person. The capture mass employed may be selected from those known to the skilled person. The capture mass comprises a compound, usually known as the active phase, which reacts with the heavy metal in order to capture the heavy metal on the capture mass. The capture mass is preferably in the form of a bed composed of granules.

In particular to capture mercury, the active phase of the capture mass may comprise metals which, in their sulphide form, react with mercury. The metallic sulphide or sulphides contained in the capture mass of the invention are based on a metal selected from the group constituted by copper (Cu), chromium (Cr), manganese (Mn), iron (Fe), cobalt (Co) and nickel (Ni). Preferably, the metal or metals of the metallic sulphide or sulphides are selected from the group constituted by copper (Cu), manganese (Mn), iron (Fe) and nickel (Ni). Highly preferably, if a single metallic sulphide is present, copper sulphide is selected.

The active phase used may also be elemental sulphur, for example as described in the patent document FR 2 529 802.

The heavy metal guard bed is disposed upstream of the deacidification units (for example an amine unit), and so the gas to be treated contains $H_2S$. Thus, it is also possible to use the metallic oxide precursor, the metal being selected from the group constituted by copper (Cu), chromium (Cr), manganese (Mn), iron (Fe), cobalt (Co) and nickel (Ni), preferably copper oxide, which can be used to jointly eliminate $H_2S$ and mercury by being sulphided by $H_2S$ in a first step into a metallic sulphide, then by being reacted with mercury.

In order to capture arsenic, and in particular in its gaseous form of $AsH_3$, the active phase of the capture mass may in particular comprise metals which react with arsenic in their oxide form. The metallic oxide or oxides contained in the capture mass of the invention are based on a metal selected from the group constituted by copper (Cu) and lead (Pb). Preferably, if a single metallic oxide is present, the choice is based on copper oxide (II), also termed cupric oxide (CuO). Highly preferably, if a single metallic oxide is present, this is selected to be lead (II) oxide (PbO).

Preferably, the capture mass may be constituted by an active phase as described above, distributed on a porous support.

The porous support may preferably be selected from aluminas, phosphorus-containing aluminas, silica-aluminas, silicas, clays, activated carbon, zeolites, titanium oxides, zirconium oxides and mixtures thereof.

A capture mass containing a support and copper sulphide is described in document U.S. Pat. No. 4,094,777, for example.

The capture mass may be obtained using any preparation method which is known to the skilled person, such as impregnation or co-granulation, for example.

Processing the gas treated by the capture mass 5000 is preferably carried out by injecting the effluent to be treated into a reactor containing the capture mass in the form of a fixed bed.

In the equipment 3000, the effluent to be treated may be brought into contact with the capture mass at a temperature in the range −50° C. to 115° C., preferably in the range 0° C. to 110° C., and more preferably in the range 20° C. to 100° C. Furthermore, it may be carried out at an absolute pressure in the range 0.01 MPa (0.1 bar) to 20 MPa (200 bar), preferably in the range 0.1 MPa (1 bar) to 15 MPa (150 bar), and more preferably in the range 0.1 MPa (1 bar) to 12 MPa (120 bar).

In addition, this step for bringing the effluent to be treated into contact with the capture mass may be carried out at a HSV in the range 0.1 $h^{-1}$ to 50000 $h^{-1}$. The term "HSV" means the hourly space velocity of the gaseous effluent in the capture mass, i.e. the volume of gaseous effluent per volume of reactor per hour. For a gaseous effluent to be treated, the HSV may preferably be in the range 50 $h^{-1}$ to 500 $h^{-1}$.

Contact with the capture mass may advantageously be carried out in order to capture the heavy metals, in particular mercury, contained in the effluent to be treated, and to obtain an effluent with a reduced heavy metals content, in particular of mercury, compared with the initial content of the effluent, or indeed to totally eliminate the heavy metals from the effluent.

Advantageously, the reduction in the total content by weight of heavy metal between the gaseous effluent before treatment and the effluent obtained after treatment with the capture mass may represent at least 90%, preferably at least 95% and more preferably at least 99%.

Figure 2:
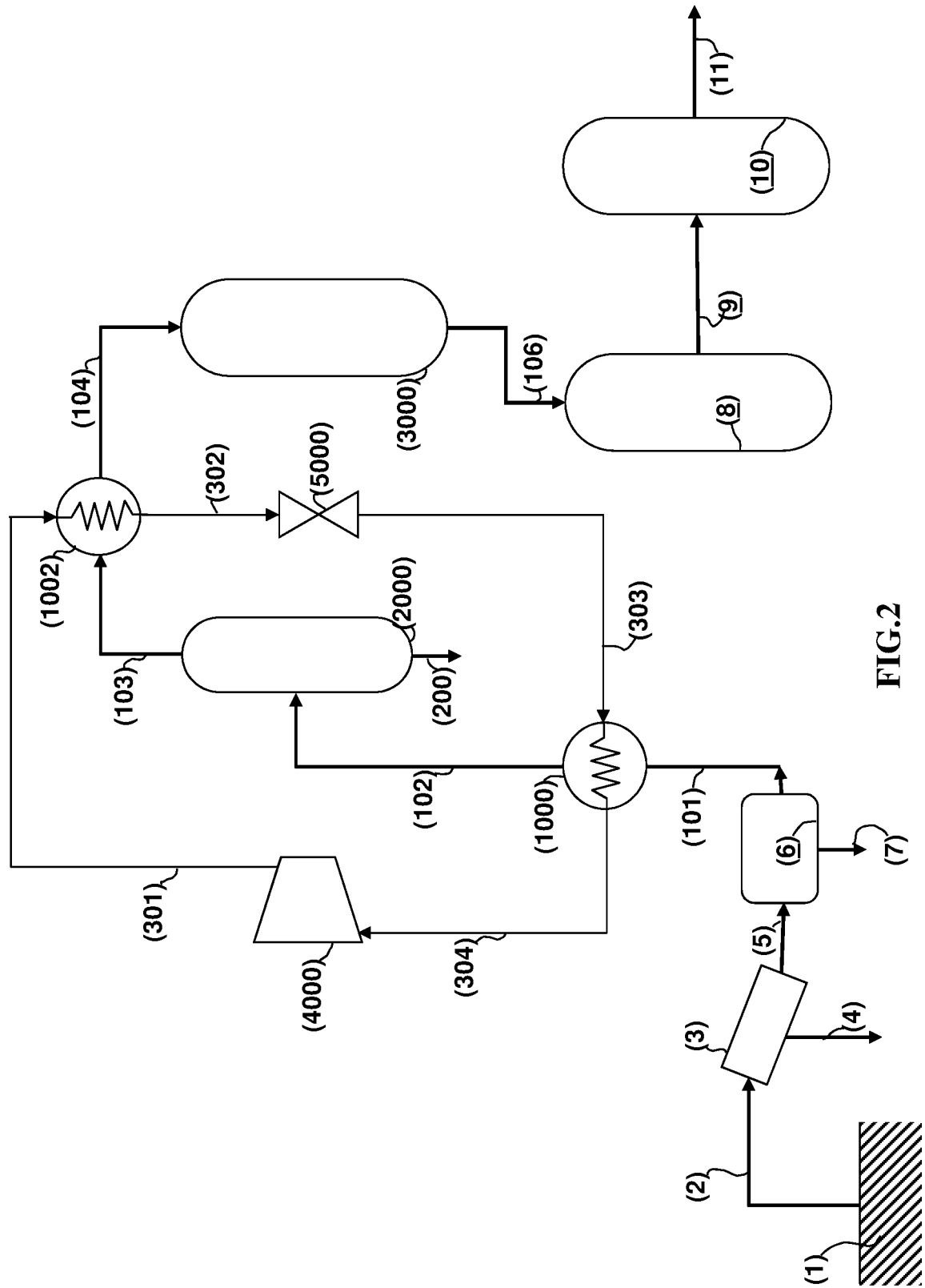
FIG. 2 represents a process for the production of a natural gas integrating the process of the invention.

FIG. 2 diagrammatically shows an example of the natural gas production process from extraction to the deacidification operation, in which the process of the invention is carried out. The references in FIG. 2 which are identical to the references in FIG. 1 designate the same elements.

The natural gas extracted from the underground deposit 1 is sent via the conduit 2 to a device 3 for trapping sludge, usually termed a slug catcher. The sludge is evacuated from the slug catcher via the conduit 4. The natural gas obtained from the device 3 is introduced via the conduit 5 into a primary gas-liquid separator 6 which can be used to eliminate a liquid stream comprising water and hydrocarbons via the conduit 7.

The liquid-depleted gas is introduced into the heat exchanger 1000 via the conduit 101 for cooling by heat exchange with the heat transfer fluid arriving via the conduit 303. The cooled gas is evacuated from the exchanger 1000 via the conduit 102 for introduction into the gas-liquid separation device 2000, for example a coalescer. The coalescer can be used to eliminate droplets of liquid 200 present in the gas. The gas, freed from droplets, is introduced via the conduit 103 into the heat exchanger 1002 for reheating by heat exchange with the heat transfer fluid arriving via the conduit 301. The reheated gas obtained from 1002 is introduced into the mercury guard bed 3000 via the conduit 104. The mercury-depleted gas is evacuated from 3000 for introduction into a deacidification unit 8 via the conduit 106.

The heat transfer fluid obtained from the exchanger 1002 is introduced into the decompression device 5000 via the conduit 302. The decompressed fluid is reheated in the heat exchanger 1000 by heat exchange with the natural gas. The reheated heat transfer fluid is evacuated from the exchanger 1000 via the conduit 304 for introduction into the compressor 4000. The compressed fluid is introduced via the conduit 301 into the exchanger 1002 for cooling by heat exchange with the natural gas.

In the unit 8, the gas is brought into contact with a liquid amine solution which absorbs $H_2S$ and possibly $CO_2$ contained in the gas. The gas, which is depleted in acidic compounds, is introduced into the dehydration unit 10 via the conduit 9. In the unit 10, the natural gas may be brought into contact with a liquid glycol solution which absorbs the water contained in the gas. Alternatively, in the unit 10, the natural gas may be brought into contact with solid water-adsorbing masses. The gas evacuated from the unit 10 via the conduit 11 may be sold.

The process of the invention is particularly suitable for the treatment of natural gas. However, the process of the invention may be applied to other types of gaseous effluents, such as combustion fumes, synthesis gas or indeed a gaseous hydrocarbon effluent, for example a shale gas, a coal gas, a gaseous oil cut or a refinery fuel gas, chlor-alkali plant exhaust gases, or rare earth production exhaust gases. The gaseous effluent comprises water in varying proportions which in particular depend on its origin and earlier treatments which it has undergone. Typically, the relative humidity of the fumes is in the range 30% to 100%.

The combustion fumes are in particular produced by the combustion of hydrocarbons, biogas, coal in a boiler or a combustion gas turbine, for example for the purposes of the production of electricity. These fumes are at a temperature in the range 20° C. to 60° C., a pressure in the range 1 to 5 bars (1 bar=0.1 MPa) and may comprise in the range 50% to 80% of nitrogen, in the range 5% to 40% of carbon dioxide, in the range 1% to 20% of oxygen, and several impurities such as $SO_x$ and $NO_x$, if they have not been eliminated upstream by a deacidification process. Synthesis gas contains carbon monoxide CO, hydrogen $H_2$ (generally in a $H_2/CO$ ratio of 2), water vapour (generally at saturation at the temperature at which scrubbing is carried out) and carbon dioxide $CO_2$ (of the order of 10%). The pressure is generally in the range 20 to 30 bar, but may be up to 70 bar. It also further contains sulphur-containing impurities ($H_2S$, COS, etc), nitrogen-containing impurities ($NH_3$, HCN) and halogenated impurities. Depending on the positioning of the demercuration step in the synthesis gas purification chain, its relative humidity is in the range 5% to 100%.

The following examples demonstrate the advantages of the invention.

EXAMPLE 1

Context

In this example, two commercial mesoporous solids A and B were considered and used for demercuration and characterized by the pore volume distributions shown in Table 1.

TABLE 1

Proportion of pore types of solids A and B under consideration

| | % pore volume | |
|---|---|---|
| | Solid A | Solid B |
| Micropores (d < 2 nm) | 0 | 0 |
| Mesopores (2 < d < 50 nm) | 49 | 60 |
| Macropores (d > 50 nm) | 51 | 40 | in which d corresponds to the pore diameter of the solid, measured using a mercury porosimetry method, for example the method described in the document by Rouquerol F.; Rouqerol J.; Singh K. Adsorption by powers & porous solids: Principle, methodology and applications, Academic Press, 1999.

Assuming that the pores are cylindrical, Kelvin's law (equation 2) can be applied to determine, as a function of the moisture content, the proportion of the total pore volume filled with liquid water. The assumed conditions were a fluid which completely wets the surface ($\theta=0$), a surface tension equal to that of an air/water system ($\gamma=67.9$ mN·$m^{-1}$ at T=50° C.) and the temperature T=50° C. The saturated vapour pressure $P_0$ of the water was determined using Antoine's law ($P_0=105.20389-1733.926/(T-39.485)$). The results of this calculation are shown in Table 2.

TABLE 2

Percentage of pore volume filled as a function of moisture content

| Moisture content | % of total pore volume filled in the humidity range | |
|---|---|---|
| | Solid A | Solid B |
| $0 < P/P_0 < 25$ | 0 | 0 |
| $25 < P/P_0 < 50$ | 0.02 | 0.01 |
| $50 < P/P_0 < 70$ | 1.55 | 1.27 |
| $70 < P/P_0 < 80$ | 6.52 | 8.01 |
| $80 < P/P_0 < 90$ | 30.72 | 42.40 |
| $90 < P/P_0 < 99.9$ | 57.62 | 45.55 |

It can clearly be seen that the majority of the pores were not affected beyond a moisture content of approximately 80%. Beyond that, a substantial increase in the total pore volume filled with liquid water was observed up to approximately 100% for moisture contents close to saturation.

Assuming a homologous distribution of the active phase over the surface of the support, it is possible to calculate the quantity of active phase rendered inactive, because it is inaccessible due to filling of the pores, as a function of the moisture content.

| Moisture content | % of active phase which is inaccessible in the moist content range | |
|---|---|---|
| | Solid A | Solid B |
| $0 < P/P_0 < 25$ | 0 | 0 |
| $25 < P/P_0 < 50$ | 0 | 1.10 |
| $50 < P/P_0 < 70$ | 7.06 | 5.08 |
| $70 < P/P_0 < 80$ | 21.29 | 23.03 |
| $80 < P/P_0 < 90$ | 46.17 | 58.75 |
| $90 < P/P_0 < 99.9$ | 25.48 | 12.04 |

In agreement with this data, a dynamic mercury capture test carried out on 1 g of capture mass A showed that the purification efficiency was 100% after one hour for a moisture content of 25%; 100% after one hour for a moisture content of 50%; 90% after one hour for a moisture content of 75%; 25% after one hour for a moisture content of 90% and 0% after one hour for a moisture content of 100%.

In agreement with these data, a dynamic mercury capture test carried out on 1 g of capture mass B showed that the purification efficiency was 100% after one hour for a moisture content of 25%; 100% after one hour for a moisture content of 50%; 90% after one hour for a moisture content of 75%; 15% after one hour for a moisture content of 90% and 0% after one hour for a moisture content of 100%.

The function of the capture masses was thus only altered to a moderate extent up to a moisture content of 80%. A fortiori, in order to provide a safety margin, it is recommended to maintain the relative moisture content of the gas to be treated in the demercuration step at a relative humidity of less than 75%.

EXAMPLE 2

Not in Accordance with the Invention

This example is given by way of comparison. In this example, the water content of a moist gas saturated with water was to be reduced to below 75% in accordance with that disclosed in Example 1.

It was intended to evaluate the quantity of energy necessary to reduce the relative moisture content of a natural gas saturated with water to 75% relative humidity by reheating the whole of the stream to be treated. This was based on the following initial conditions: the moist gas was a natural gas saturated with water produced at 70 bar and 30° C. and with a dry flow rate of 140000 Nm³/h. Its dry composition is given in Table 3.

TABLE 3

Composition of dry gas

| Compound | % mol |
|---|---|
| $CO_2$ | 10.7 |
| $O_2$ | 0.8 |
| $N_2$ | 0.9 |
| C1 | 77.2 |
| $C_2$ | 6.6 |
| $C_3$ | 2.2 |
| $iC_4$ | 0.2 |
| $nC_4$ | 0.5 |
| $iC_5$ | 0.2 |
| $nC_5$ | 0.3 |
| $C_6$ | 0.2 |
| $C_7$ | 0.1 |
| $C_8$ | 0.1 |

When this gas was saturated with water, its water vapour content was 880 ppm mol.

The results presented below result from a simulation using Aspen Hysys v7.2 software. The SRK (Soave-Redlich-Kwong) model was the thermodynamic model which was selected.

The temperature at which a relative humidity of 75% was obtained was 35.5° C. The thermal power necessary to heat the flow of gas from 30° C. to 35.5° C. was 500 kWth (kilowatt thermal).

Next, the reheated gas was treated on a mercury guard bed.

EXAMPLE 3

In Accordance with the Invention

This example in accordance with the invention was aimed at reducing the water content of a moist gas below 75% in agreement with the disclosure in Examples 1 and 2 in order to prevent any major phenomena of capillary condensation in the mercury capture masses as described in Example 1. The partial gas drying unit located upstream of the demercuration unit is described in FIG. 1, in which the heat exchangers 1001, 1003, 1004 and 1005 were not used.

The results presented below result from a simulation using Aspen Hysys v7.2 software. The SRK (Soave-Redlich-Kwong) model was the thermodynamic model which was selected.

The following initial conditions were employed: the moist gas was a natural gas saturated with water produced at 70 bar and 30° C. with a dry flow rate of 140000 Nm³/h. Its dry composition is given in Table 3 of Example 2.

When the gas was saturated with water, its water vapour content was 880 ppm mol.

The heat transfer fluid selected in the heat pump system was n-butane. The flow rate of the heat transfer fluid in the heat pump circuit was 82.3 kmol/h.

The whole of the moist gas stream was treated, i.e. the whole of the stream to be treated moved in the conduit 101.

After passing through the exchanger 1000, the temperature of the gas 101 changed from 30° C. to 25.4° C. by boiling of the n-butane heat transfer fluid at 2.24 bar, and thus at 22.4° C. The approach to thermal equilibrium in the exchange 1000 was 3° C. The heat exchanged represented a total of 462 kWth.

The gas 102 obtained from the exchanger 1000 then comprised a fraction of liquid which was to be eliminated in a coalescer 2000. The stream of condensed liquid 200 was extracted at a rate of 7.2 kmol/h for a molar fraction of water of 17% mol, the other major compound being methane (21% mol). This resulted in a dry gas 103 obtained from the coalescer 2000 which was reheated to 30.7° C. by heat exchange with the heat transfer fluid which had condensed in the heat exchanger 1002, in this case n-butane which condensed at 35° C. at 3.40 bar. This represented a heat exchange of 492 kWth.

The resulting quantity of water in the stream 104 was 682 ppm mol, i.e. 74.6% of water saturation.

To this end, the heat pump employed used n-butane as the heat transfer fluid between 2.24 bar and 3.40 bar. The decompressed fluid 303 was two-phase, with an 8.5% vapour fraction and a temperature of 22.4° C., its state change temperature. The fluid 303 was vaporized in its entirety at 300 in the heat exchanger 1000 and the counter current configuration meant that a temperature of 27° C. was obtained. The vaporized fluid was compressed from 2.24 bar to 3.40 bar by the compressor 4000. The fluid 301 which had thus been compressed was at a temperature of 41.9° C. This fluid was condensed in its entirety in the exchanger 1002 in order to produce the fluid 302 at 3.40 bar at a resulting temperature of 35° C.

Here, it was assumed that compression was with an electrically driven centrifugal compressor 4000 with an efficiency of 75%. This implied an electrical power of 30 kWe (kilowatt electric).

Thus, a characteristic coefficient of performance (CoP) for the heat pumps, namely the ratio between the thermal power of the evaporator and the electrical power of the compressor, could be calculated. In this example, the CoP was 15.4.

By way of example, if the combustion of natural gas to produce the electricity necessary for the operation of the heat pump with an efficiency of 40% were to be considered, this 30 kWe of electricity would have an equivalent of 75 kWth of gas.

The choice of 40% for the efficiency is conservative, as gas turbines can reach net electrical efficiencies of much greater than 50%.

CONCLUSIONS FOR EXAMPLES 2 AND 3

Carrying out Example 3 in accordance with the invention (which requires an electrical power of 30 kWe, i.e. 75 kWth) thus induces a reduction in the consumption of the heating utilities by a facility of at least 6 compared with the solution described in Example 2 (which requires an electrical power of 500 kWth).

The invention claimed is:

1. A process for capturing at least one mercury or arsenic heavy metal, contained in a gaseous hydrocarbon effluent comprising water vapor, comprising:
    a) cooling (1000) the gaseous hydrocarbon effluent by heat exchange with a heat transfer fluid produced in e) in order to obtain a gas cooled 2 to 10° C. to a temperature Tf, the heat transfer fluid being vaporized during a);
    b) separating (2000) at least a portion of condensed water contained in the cooled gas obtained in a) in a manner such as to obtain a gas which is depleted in water and a liquid stream containing water;
    c) compressing (4000) the vaporized heat transfer fluid obtained from a) in a manner such as to obtain a compressed heat transfer fluid;
    d) heating (1002) the water-depleted gas by heat exchange with the compressed heat transfer fluid obtained in c) in order to obtain a cooled heat transfer fluid and a gas reheated 2 to 10° C. to a temperature Tc, the temperature Tc being determined in a manner such that the reheated moist gas obtained in d) has a relative humidity of less than 75%;
    e) decompressing (5000) the cooled heat transfer fluid obtained in d), the decompressed heat transfer fluid being recycled to a);
    f) bringing the reheated gas obtained in d) into contact (3000) with a capture mass for said heavy metal in order to obtain a gas depleted in heavy metal.

2. The process according to claim 1, in which the temperature Tc is determined in a manner such that the reheated moist gas obtained in d) has a relative humidity of less than 50%.

3. The process according to claim 1, in which the capture mass comprises an active phase comprising at least one metallic sulphide of a copper (Cu), chromium (Cr), manganese (Mn), iron (Fe), cobalt (Co) or nickel (Ni).

4. The process according to claim 1, in which the capture mass comprises an active phase of elemental sulfur.

5. The process according to claim 1, in which, when the moist gas contains $H_2S$, the capture mass comprises an active phase of at least one metallic oxide of copper (Cu), chromium (Cr), manganese (Mn), iron (Fe), cobalt (Co) or nickel (Ni).

6. The process according to claim 1, in which the capture mass comprises an active phase of at least one metallic oxide of copper (Cu) or lead (Pb).

7. The process according to claim 3, in which the active phase is distributed over a porous support, the porous support being an alumina, a phosphorus-containing alumina, a silica-alumina, a silica, a clay, an activated carbon, a zeolite, a titanium oxide, a zirconium oxide or a mixture thereof.

8. The process according to claim 1, in which the heat transfer fluid is a hydrocarbon containing 1 to 7 carbon atoms and optionally one or more heteroatomic ligands.

9. The process according to claim 1, in which at least one of the following operations is carried out:
    before carrying out b), carrying out a supplemental cooling of the cooled gas obtained in a);
    before carrying out c), carrying out a supplemental heating of the vaporized heat transfer fluid obtained in a);
    before carrying out f), carrying out a supplemental heating of the reheated gas obtained in d);
    before carrying out e), carrying out a supplemental cooling of the cooled heat transfer fluid obtained in d).

10. The process according to claim 9, further comprising exchanging of heat from the vaporized heat transfer fluid obtained in a) to the cooled heat transfer fluid obtained in d).

11. The process according to claim 1, in which in b), a coalescer is used in order to separate the condensed water contained in the cooled gas obtained in a).

12. The process according to claim 1, in which mercury contained in the aqueous liquid stream obtained from b) is captured.

13. The process according to claim 1, in which the moist gas is a natural gas.

14. The process according to claim 1, in which the moist gas is a natural gas and in which before carrying out a), the following are carried out:

extracting a natural gas from an underground deposit; then introducing the natural gas into a sludge elimination device; then introducing the natural gas into a gas-liquid separation device then sending the natural gas to a);

then, after f), the following are carried out:

eliminating at least a portion of $H_2S$ and $CO_2$ contained in the gas depleted in heavy metal; then eliminating at least a portion of water vapor contained in the gas depleted in heavy metal.

15. The process according to claim 1, wherein the moist gas to be treated is at a pressure of 2-10 MPa.

16. The process according to claim 1, wherein the moist gas to be treated is at a pressure of 5-9 MPa.

17. The process according to claim 1, wherein the moist gas is at a temperature of 20 to 80° C.

18. A process for capturing at least one mercury or arsenic heavy metal, contained in a moist gas that is a natural gas, a shale gas, a coal gas, a synthesis gas, combustion fumes, a gaseous hydrocarbon effluent, or rare earth production exhaust gas, comprising water vapor, consisting of:

a) introducing the moist gas into a primary gas-liquid separator (6) separating a liquid stream comprising water and hydrocarbon from the moist gas to produce an effluent moist gas, b) cooling (1000) the effluent moist gas by heat exchange with a heat transfer fluid produced in e) in order to obtain a gas cooled to a temperature Tf, the heat transfer fluid being vaporized during b);

c) separating (2000) at least a portion of condensed water contained in the cooled gas obtained in b in a manner such as to obtain a gas which is depleted in water and a liquid stream containing water;

d) compressing (4000) the vaporized heat transfer fluid obtained from b) in a manner such as to obtain a compressed heat transfer fluid;

e) heating (1002) the water-depleted gas by heat exchange with the compressed heat transfer fluid obtained in d) in order to obtain a cooled heat transfer fluid and a gas reheated to a temperature Tc, the temperature Tc being determined in a manner such that the reheated moist gas obtained in e) has a relative humidity of less than 75% in which the difference between Tc and Tf is less than 20° C.;

f) decompressing (5000) the cooled heat transfer fluid obtained in e, the decompressed heat transfer fluid being recycled to b);

g) bringing the reheated gas obtained in e into contact (3000) with a capture mass for said heavy metal in order to obtain a gas depleted in heavy metal.

19. The process according to claim 1, wherein the temperature Tc is determined in a manner such that the reheated moist gas obtained in d) has a relative humidity of 50% to less than 75%.

\* \* \* \* \*